United States Patent
de Queiroz (10) Patent No.: US 6,175,653 B1
(45) Date of Patent: Jan. 16, 2001

(54) FAST DECOMPRESSION AND ROTATION FOR DEVICES WITH ASYMMETRIC RESOLUTION

(75) Inventor: Ricardo L. de Queiroz, Pittsford, NY (US)

(73) Assignee: Xerox Corporation, Stamford, CT (US)

( * ) Notice: Under 35 U.S.C. 154(b), the term of this patent shall be extended for 0 days.

(21) Appl. No.: 09/075,851

(22) Filed: May 12, 1998

(51) Int. Cl.[7] ............................... G06K 9/36; G06K 9/46
(52) U.S. Cl. ............................................................. 382/233
(58) Field of Search .................................... 382/248, 250, 382/277, 296, 297, 298, 299, 300, 301, 233

(56) References Cited

U.S. PATENT DOCUMENTS

| | | | |
|---|---|---|---|
| 5,020,115 | * | 5/1991 | Black ................................ 382/298 |
| 5,297,217 | * | 3/1994 | Hamilton et al. ................. 382/296 |
| 5,867,612 | * | 2/1999 | Robson ............................. 382/298 |
| 5,911,007 | * | 6/1999 | Miyake ............................. 382/233 |
| 6,002,810 | * | 12/1999 | Wakisawa et al. ............... 382/298 |

* cited by examiner

Primary Examiner—Joseph Mancuso
Assistant Examiner—F. E. Cooperrider
(74) Attorney, Agent, or Firm—Oliff & Berridge, PLC (57) ABSTRACT

A decompressor and decompression methods rotate and decompress compressed images for devices with asymmetric resolution. A compressed data file is transmitted and/or input to a decompressor. The decompressor receives a group of consecutive image blocks of the compressed data file and separately scaled-inverse-transforms each image block in the group. Then, each block is placed in a macroblock. Accordingly, the combination of the scaled blocks provides the required global scaling for image rotation. Thus, time and effort spent in scaling the decompressed image is avoided.

18 Claims, 7 Drawing Sheets

FAST DECOMPRESSION AND ROTATION FOR DEVICES WITH ASYMMETRIC RESOLUTION

BACKGROUND OF THE INVENTION

1. Field of Invention

This invention generally relates to processing compressed digital images. More particularly, this invention relates to methods and apparatus which combine rotation with decompression of compressed images for devices with asymmetric resolution. The rotation and scaling are built into the decompressing process to avoid spending time and effort in scaling and rotating the decompressed image.

2. Description of Related Art

Data compression is required in data handling processes, where too much data is present for practical applications using the data. Commonly, compression is used in communication links to reduce the transmission time or required bandwidth. Similarly, compression is preferred in image storage systems, including digital printers and copiers, where "pages" of a document to be printed are stored temporarily in precollation memory. The amount of media space on which the image data is stored can be substantially reduced with compression. Generally speaking, scanned images, i.e., electronic representations of hard copy documents, are often large, and thus make desirable candidates for compression.

The image compression standard disseminated by the Joint Photographic Experts Group (JPEG) committee is a compression technique which reduces data redundancies based on pixel-to-pixel correlations. Generally, an image does not change very much on a pixel-to-pixel basis and therefore has what is known as "natural spatial correlation." In natural scenes, correlation is generalized, but not exact. Noise makes each pixel somewhat different from its neighbors.

Many output devices provide an output image having different spatial resolutions in pixels per inch (ppi) along the horizontal and vertical orientation. One example of such a device can be a printer employing 400 ppi×600 ppi resolution, i.e., the printer prints 400 ppi in the vertical direction and 600 ppi along the horizontal direction. One typical problem encountered when processing images directed for those devices arises when it is necessary to change the orientation of the image. In such an instance, in order to maintain the same aspect ratio while changing the image's orientation, the amount of image pixels in each direction has to be changed accordingly to cope with the change in resolution. For example, a rotation by 90° or an image transposition will change the orientation of the image. Examples of applications are those that require the image to be changed from "portrait" mode to "landscape" mode for printing, either to adjust the paper output requirements or by any aesthetic motivation.

Figure 1:
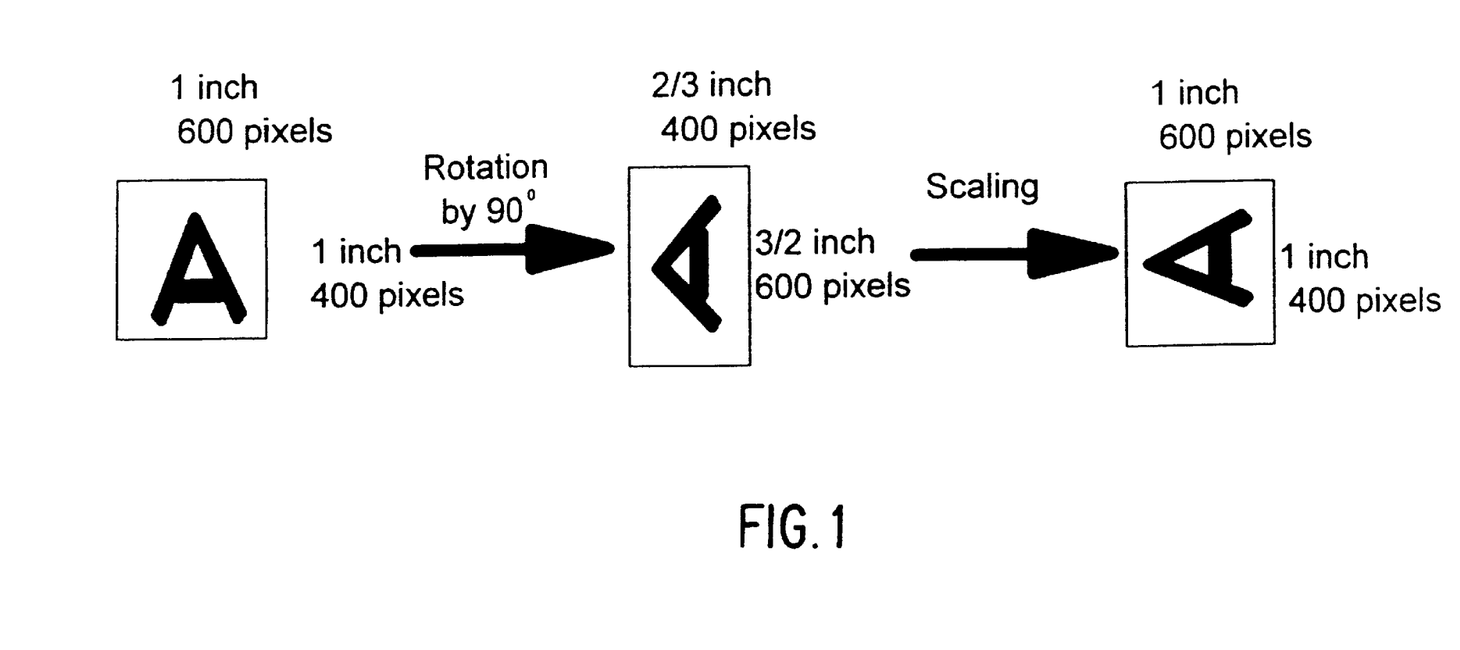
FIG. 1 shows one conventional asymmetric resolution rotation process.
Figure 2:
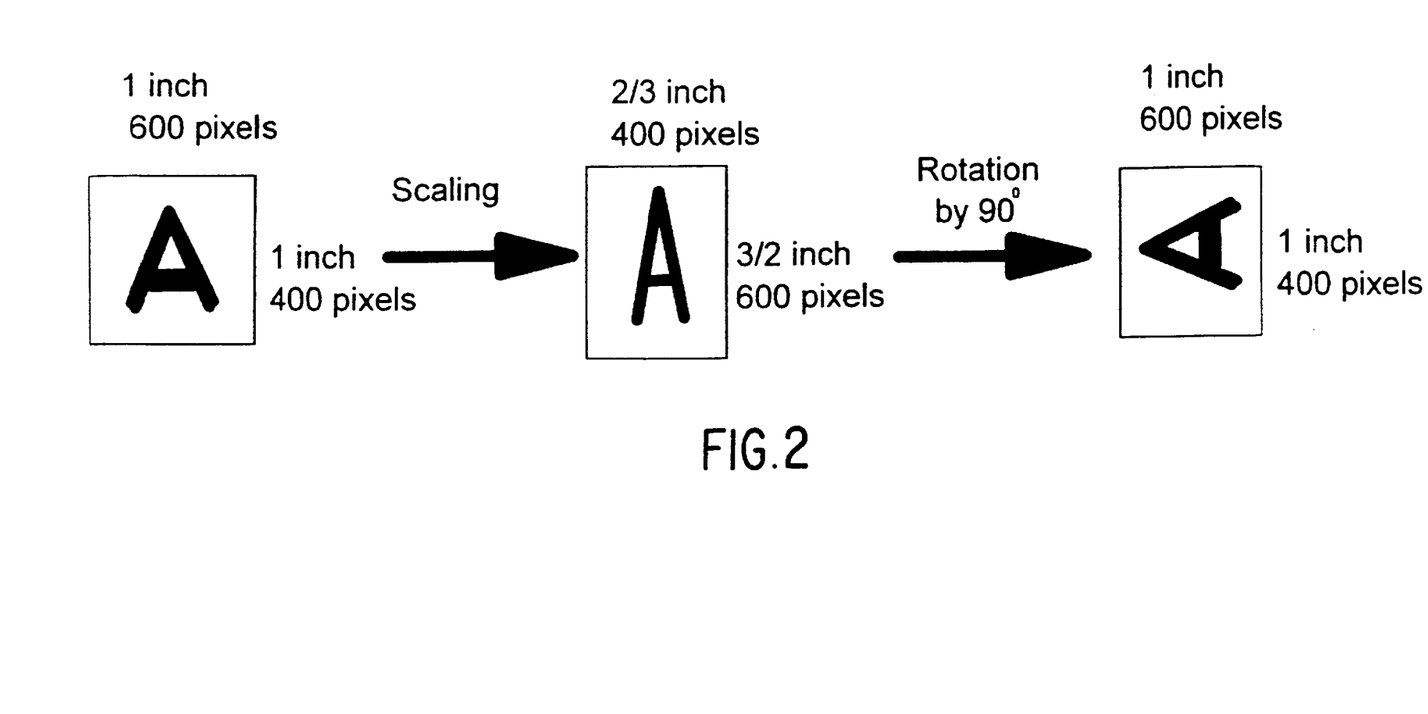
FIG. 2 shows another conventional asymmetric resolution rotation process.

FIG. 1 shows an example of an image being printed on a 400 ppi×600 ppi printer occupying a square region of 1 in.×1 in. If the image is simply rotated, maintaining the number of pixels, it would occupy a region of 2/3 in.×3/2 in. and be distorted. Thus, a spatial scaling operation is necessary to "stretch" the image in one direction and to "shrink" the image in the other direction to maintain the image's aspect ratio. Alternatively, FIG. 2 shows a sequence to obtain the same output by pre-scaling the image before rotation.

SUMMARY OF THE INVENTION

In a conventional method to perform rotation for devices with asymmetric resolutions, an image source provides the compressed image data to the system. The image source can be an input device such as a camera or scanner, a transmission channel or a storage device. The compressed image data is input to a decompression unit that reconstructs the image. The uncompressed image is fed into the image rotation unit, whose output is sent to a scaling unit to correct the size and aspect ratio. The image output by the scaling unit is sent to an output image sink, which can be a storage device, a transmission line, or a display device such as a printer or monitor. The disadvantage of this method is that scaling and rotation operations are performed on the decompressed image. Color documents typically contain tens of millions of pixels, such that even simple operations on those image can be expensive and time consuming.

The system and method of this invention improve the performance of the rotation process, by reducing its complexity.

This invention is directed to reducing the computation effort spent in decompressing and rotating a compressed image. The image targeted to be printed in a device possesses asymmetric resolution, i.e. different resolution between the vertical and horizontal orientations. In this context, rotation is assumed to be an operation which rotates the image by +90° or −90° or even may represent image transposition. The operations can also be combined with image mirroring in the vertical or horizontal direction.

This invention provides an apparatus and method for converting, for example, a first image with unequal resolution into a second image with unequal resolution image while performing an image rotation. The conversion takes place in the JPEG decompression module. Image rotation is accomplished by modifying the signs of specific DCT coefficients before decompression and by re-arranging blocks. The scaling operation may precede or follow the rotation, as illustrated in FIG. 1 and FIG. 2, and is performed by modifying the inverse DCT operation. If the image was compressed using forward DCT of size M×M, scaling can be accomplished by replacing the M×M inverse DCT by other sizes. Unlike simple scaling processes, the scaling for rotation purposes often requires resolution changes by rational factors which do not fit in the DCT framework. This invention provides a method to scale the image by general rational factors by applying a set of inverse DCT matrices of different sizes.

In one preferred embodiment, rotation and scaling can be accomplished in the DCT domain by processing each block of M×M DCT coefficients of a compressed image. The DCT coefficients are modified to achieve intra-block rotation and are grouped into a group of blocks. The blocks in a group of blocks undergo an inverse DCT operation utilizing DCT operators of different sizes, while the resulting pixel blocks are arranged in a rotated macroblock. Rotated macroblocks are the components of the final rotated image.

By avoiding the very expensive process of scaling and rotating the decompressed image, this invention reduces considerably the computation necessary to rotate an image for an asymmetric device. Using this method, the rotated image has excellent quality, and artifacts caused by the different block sizes are generally avoided.

This technique can be implemented, for example, by modifying basic JPEG decompression engines, where image rotation is performed on the compressed image data (compressed units). Accordingly, the technique can be applied to any number of systems, including digital printers and copiers, that need to provide a rotated image. An apparatus implementing this invention can include data or image processing systems capable of compressing images. The techniques and systems described herein are advantageous because they are efficient and result in decreased time spent in scaling the decompressed image.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

In this invention, a compressed image to be printed using a resolution of $R_1$ ppi×$R_2$ ppi is rotated. Rotation is obtained by performing operations in the compressed domain, so that the image which is decompressed possesses, after rotation, the correct size, aspect ratio and orientation corresponding to the original image. In one preferred embodiment of this invention, the image is compressed using discrete transforms applied to blocks of $M_1$ pixels×$M_2$ pixels of the original image. The compressed image data, therefore, contains quantities relative to the visual appearance of each block of $M_1$ pixels×$M_2$ pixels in the original image. In one preferred embodiment of this invention, the discrete transform is the DCT.

According to the teachings of co-pending U.S. patent application Ser. No. 08/721,130, filed Sep. 26, 1996 and incorporated herein in its entirety, rotating an image compressed using the DCT can be accomplished in two steps. In the first step, for each block, the sign of some DCT coefficients is modified and the coefficients are transposed, or rearranged, in order to perform intra-block rotation. Intra-block rotating each block in the DCT domain followed by conventional inverse DCT is equivalent to performing the inverse DCT and then rotating the resulting pixels. In the second step, the intra-block rotated blocks are inter-block rotated. In the inter-block rotation process, the relative displacements of the blocks are altered to reflect the image rotation. In contrast, in the preferred embodiment of this invention, the image is decompressed and inter-block rotation is preferably performed while the decompressed blocks are being written to the uncompressed output image buffer.

Along with rotation, for asymmetric devices, the image has to be scaled to maintain the original size and aspect ratio. According to this invention, the image is compressed by processing blocks of $M_1$ pixels×$M_2$ pixels and is decompressed using an asymmetric resolution of $R_1$ ppi×$R_2$ ppi, so that each block is to be output having an area of size ($M_1/R_1$) in.×($M_2/R_2$) in. If each block is rotated by +90° or −90°, or is transposed, each block in the resulting image should have an area otsize ($M_2/R_2$) in.×($M_1/R_1$) in. In order to maintain the original size and aspect ratio after rotation, each block needs to be scaled to contain $P_1$ pixels×$P_2$ pixels, where:

$$P_1 = M_2 \frac{R_1}{R_2} = M_2 R_{12}; \text{ and}$$

$$P_2 = M_1 \frac{R_2}{R_1} = M_1 R_{21}.$$

In the common case wherein $P_1$ or $P_2$ are not integers, direct scaling in the DCT domain is not possible. According to this invention, the quantity $K_1$, which is the smallest integer such that $K_1 P_1 = K_1 M_2 R_{12}$ is an integer, and a quantity $K_2$, which is the smallest integer such that $K_2 P_2 = K_2 M_1 R_{21}$ is an integer, are determined. Subsequently, $K_1$ positive numbers $U_1$ and $K_2$ positive numbers $V_i$ are determined such that:

$$\sum_{i=1}^{K_1} U_i = K_1 P_1; \text{ and}$$

$$\sum_{i=1}^{K_2} V_i = K_2 P_2.$$

After the determination of $K_2$, $K_1$, $U_i$ and $V_i$, the rotation of the image is integrated into the decompression process.

According to this invention, the compressed data is decompressed to form block matrices of DCT coefficients. The DCT coefficient matrices are transposed. For each matrix, a group of blocks is formed by grouping $K_2 \times K_1$ blocks of $M_1 \times M_2$ DCT coefficients:

$$\begin{bmatrix} (M_1 \times M_2)_{1,1} & (M_1 \times M_2)_{2,1} & (M_1 \times M_2)_{3,1} & \cdots & (M_1 \times M_2)_{K_1,1} \\ (M_1 \times M_2)_{1,2} & (M_1 \times M_2)_{2,2} & (M_1 \times M_2)_{3,2} & \cdots & (M_1 \times M_2)_{K_1,2} \\ \vdots & \vdots & \vdots & \ddots & \vdots \\ (M_1 \times M_2)_{1,K_2} & (M_1 \times M_2)_{2,K_2} & (M_1 \times M_2)_{3,K_2} & \cdots & (M_1 \times M_2)_{K_1,K_2} \end{bmatrix}$$

Each block in the position (i,j) in a group of blocks is decompressed using an inverse DCT relating $M_1 \times M_2$ coefficients to $U_j \times V_i$ pixels:

$$\begin{bmatrix} IDCT(U_1 \times V_1) & IDCT(U_2 \times V_1) & \cdots & IDCT(U_{KI} \times V_1) \\ IDCT(U_1 \times V_2) & IDCT(U_2 \times V_2) & \cdots & IDCT(U_{KI} \times V_2) \\ \vdots & \vdots & \ddots & \vdots \\ IDCT(U_1 \times V_{K2}) & IDCT(U_2 \times V_{K2}) & \cdots & IDCT(U_{KI} \times V_{K2}) \end{bmatrix}$$

The process to perform the inverse DCT leading a block of $M_1 \times M_2$ DCT coefficients to $U_j \times V_i$ pixels can be for example the method disclosed in the incorporated '130 application. In the incorporated '130 application, the $M_1 \times M_2$ DCT coefficients $y_{mn}$ are grouped into a matrix. The inverse DCT converting a block of $M_1 \times M_2$ DCT coefficients to $U_j \times V_i$ pixels is then performed. In this invention, the $M_1 \times M_2$ DCT coefficients $Y_{mn}$ can be grouped into a matrix E:

$$E = \begin{bmatrix} y_{11} & y_{12} & \cdots & y_{1,M2} \\ y_{21} & y_{22} & \cdots & y_{2,M2} \\ \vdots & \vdots & \ddots & \vdots \\ y_{M1,1} & y_{M1,2} & \cdots & y_{M1,M2} \end{bmatrix}$$

According to this invention, the matrix E is mapped to another matrix F of dimensions $U_j \times V_i$. If $U_j < M_1$, the DCT coefficients $y_{mn}$ for $m > U_j$ are discarded. If $U_j > M_1$, the matrix is padded with $U_j - M_1$ rows of null elements (zeroes). If $V_i < M_2$, the DCT coefficients $y_{mn}$ for $n > V_1$ are discarded. If $V_i > M_2$, the matrix is padded with $V_1 - M_2$ columns of null elements (zeroes). For example, if $U_j < M_1$ and $V_1 > M_2$, the resulting matrix $F_1$ is reduced in the vertical direction and extended with null columns in the horizontal direction:

$$F_1 = \begin{bmatrix} y_{11} & y_{12} & \cdots & y_{1,M2} & 0 & \cdots & 0 \\ y_{21} & y_{22} & \cdots & y_{2,M2} & 0 & \cdots & 0 \\ \vdots & \vdots & \ddots & \vdots & \vdots & \ddots & \vdots \\ y_{Uj,1} & y_{Uj,2} & \cdots & y_{Uj,M2} & 0 & \cdots & 0 \end{bmatrix}$$

Similarly, if $U_j > M_1$ and $V_i < M_2$, the resulting matrix $F_2$ is reduced in the horizontal direction and extended with null rows in the vertical direction:

$$F_2 = \begin{bmatrix} y_{11} & y_{12} & \cdots & y_{1,Uj} \\ y_{21} & y_{22} & \cdots & y_{2,Uj} \\ \vdots & \vdots & \ddots & \vdots \\ y_{M2,1} & y_{M2,2} & \cdots & y_{M2,Uj} \\ 0 & 0 & \cdots & 0 \\ \vdots & \vdots & \ddots & \vdots \\ 0 & 0 & \cdots & 0 \end{bmatrix}$$

Subsequently, the matrix $F_1$ or $F_2$ undergoes an inverse DCT of size $U_j \times V_i$ in order to obtain the desired pixels. Each inverse transformed block of pixels in a group of blocks is positioned in an output buffer according to its final position inside the group of blocks after inter-block rotation. The rotated pixels in the rotated buffer form a macroblock. Finally, the decompressed and rotated macroblock is pasted in its final position in an output image buffer:

$$\begin{bmatrix} U_1 \times V_1 & U_1 \times V_2 & \cdots & U_1 \times V_{K2} \\ U_2 \times V_1 & U_2 \times V_2 & \cdots & U_2 \times V_{K2} \\ U_3 \times V_1 & U_3 \times V_2 & \cdots & U_3 \times V_{K2} \\ \vdots & \vdots & \ddots & \vdots \\ U_{K1} \times V_1 & U_{K1} \times V_2 & \cdots & U_{K1} \times V_{K2} \end{bmatrix}$$

The final macroblock has $K_1 M_2 R_{12}$ pixels $\times K_2 M_1 R_{21}$ pixels, which equals $K_1 P_1$ pixels $\times K_2 P_2$ pixels. Thus, the aspect ratio of the image is maintained by scaling the data corresponding to a group of blocks instead of the data corresponding to each block independently.

Figure 3:
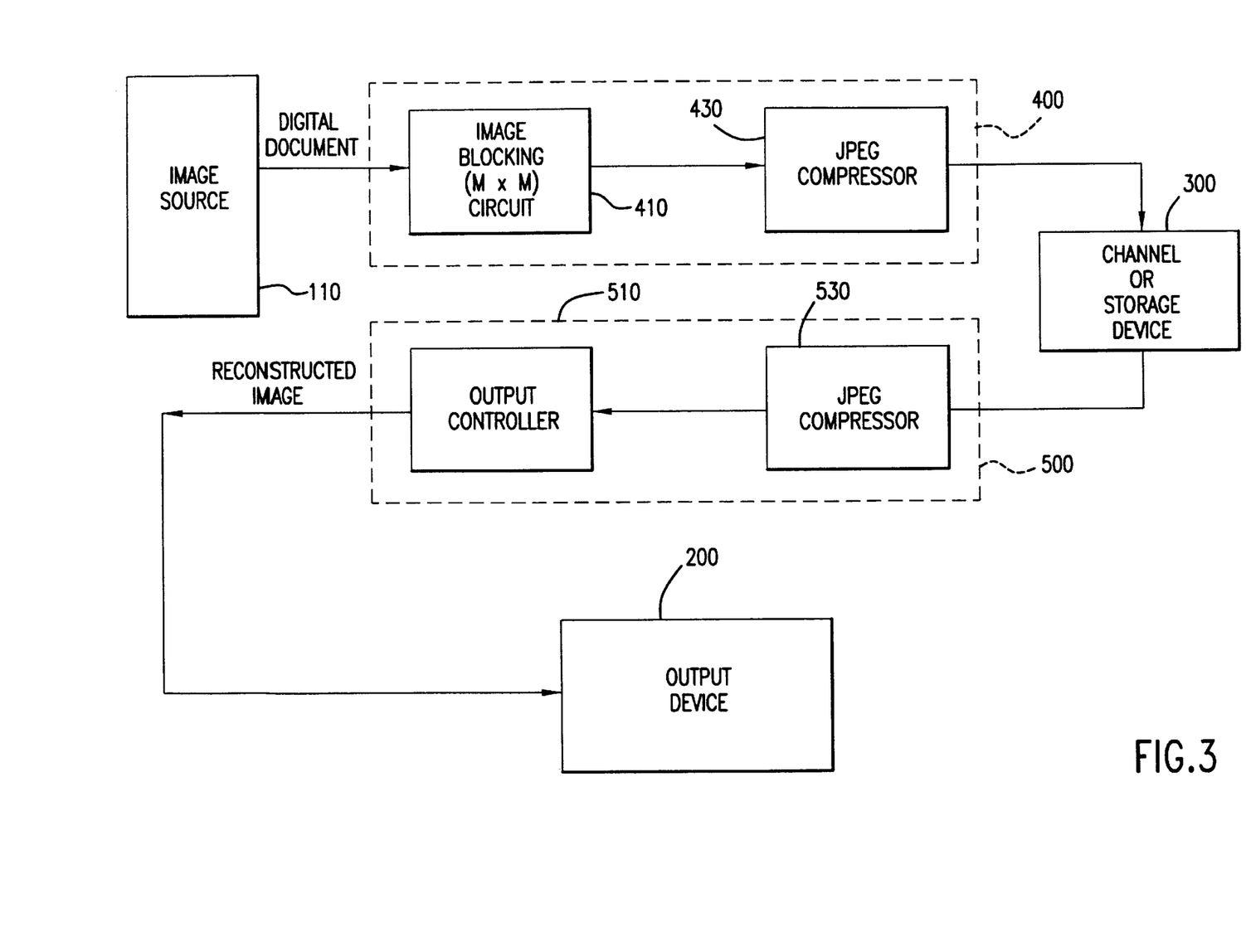
FIG. 3 is a generalized block diagram of a compression and decompression system.

FIG. 3 shows a generalized functional block diagram of a compression and decompression system 100 according to this invention. The compression and decompression system 100 includes an image source 110 that may be any one of a number of different sources, such as a scanner, digital copier or facsimile device suitable for generating electronic image data or a device suitable for storing and/or transmitting the electronic image data, such as a client or server of a network.

The electronic image data from the image source 110 is provided to an encoder 400 of the compression and decompression system.

In particular, the encoder 400 includes an image blocking portion 410 that divides the electronic image data into a plurality of M×M block or segments. In one embodiment, the blocking operation may be accomplished by windowing or cropping that enables the transfer of data comprising one or more M×M blocks of data from the input document to a block memory to be stored in the encoder 400. Once stored, the data is input by a JPEG compressor 430. In the JPEG compressor 430, the M×M blocks of image data may be operated on using various compression operations associated with the JPEG compression standard to compress the image data within a block.

Once compressed, each M×M block of the image data then is preferably transferred to the channel or storage device 300. The channel or storage device 300 can be either or both of a channel device for transmitting the compressed image data to the decoder 500 or a storage device for indefinitely storing the compressed image data until there arises a need to decompress the compressed image data. The channel device can be any known structure or apparatus for transmitting the compressed image data from a first apparatus implementing the encoder 400 according to this invention to a physically remote decoder 500 according to this invention. Thus, the channel device can be a public switched telephone network, a local or wide area network, an intranet, the Internet, a wireless transmission channel, any other distributed network, or the like.

Similarly, the storage device can be any known structure or apparatus for indefinitely storing compressed image data, such as a RAM, a hard drive and disk, a floppy drive and disk, flash memory or the like. Moreover, the storage device can be physically remote from the encoder 400 and/or the decoder 500, and reachable over the channel device described above.

The M×M block of data is then preferably processed by the decoder 500, where rotation or the like is accomplished. In particular, the decoder 500 includes a decompressor 530 that receives the M×M block of data from the channel or storage device 300 and an output controller 510 that pastes the blocks from the decompressor 530 in their corresponding position. Though the decoder 500 is shown in FIG. 3 as physically separate from the encoder 400, it is to be understood that the decoder 500 and the encoder 400 may be different aspects of a single physical device.

The output controller 510 sends the reconstructed image to the output device 200. It should be understood that the output device 200 can be any device that is capable of processing the decompressed image data generated according to the invention, for example, a rotated image.

Figure 4:
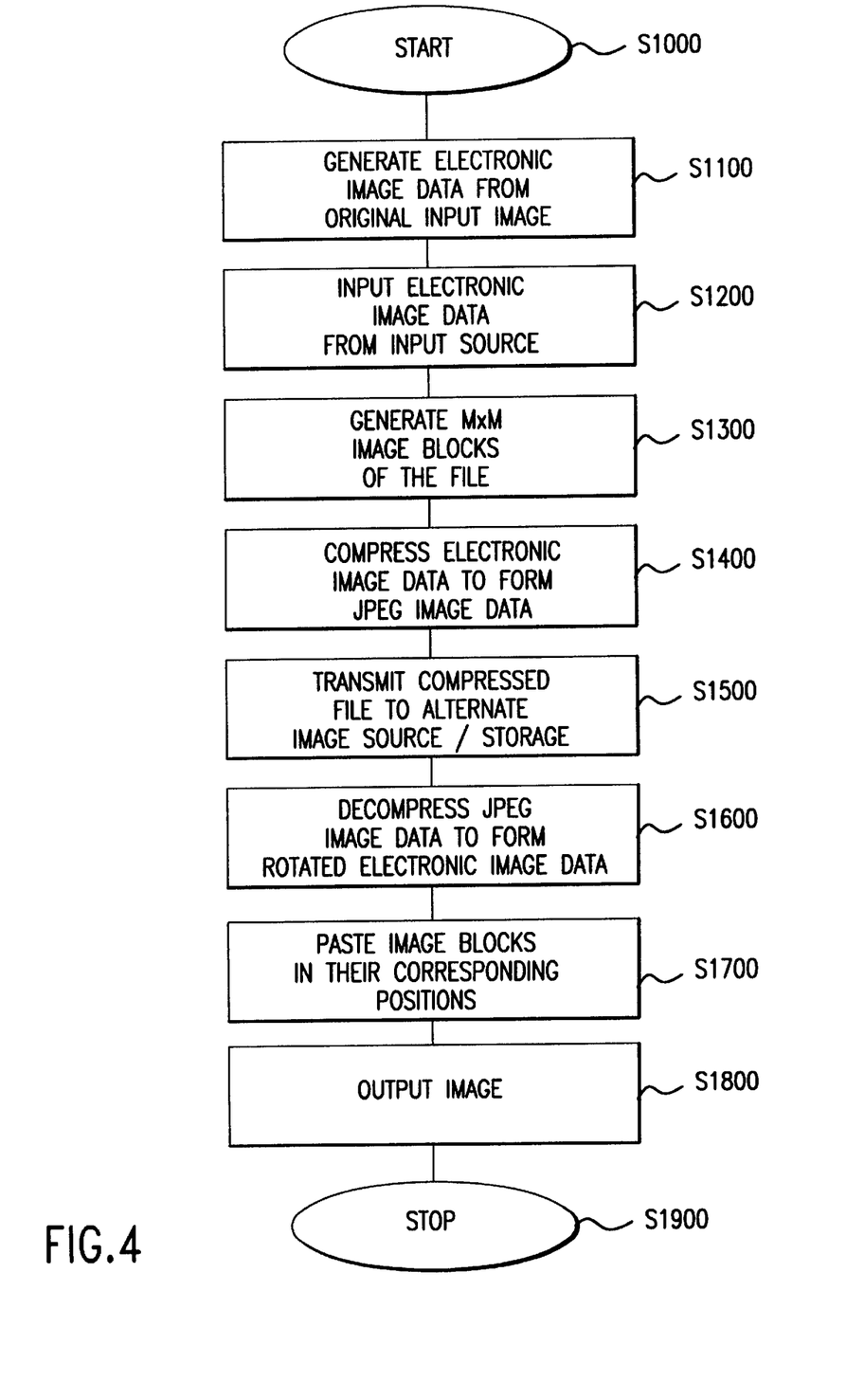
FIG. 4 is a flowchart outlining an image compression and decompression method.

FIG. 4 is a flowchart outlining an image compression and decompression method in accordance with this invention. Beginning in step S1000, control continues to step S1100, where electronic image data is generated from an original image. Then, in step S1200, the electronic image data is input from the image source.

It should be appreciated that, while the flowchart of FIG. 4 shows generating the electronic image data as part of the process, this step is not necessarily needed. That is, while the electronic image data can be generated by scanning an original image, or the like, the electronic image data could have been generated at any time in the past. Moreover, the electronic image data need not have been generated from an original physical image, but could have been created from scratch electronically. Accordingly, if the electronic image data is already available to the image source, step S1100 can be skipped, with control continuing directly from step S1000 to step S1200.

In step S1300, M×M image blocks of the file are generated. Then, in step S1400, compressed image data is generated from the M×M blocks. Next, in step S1500, the compressed image data is transmitted to an alternate image source or to storage.

It should also be appreciated that the compressed JPEG image data could have been previously stored and/or previously transmitted to the location where the compressed JPEG image data is to be decompressed, and that steps S1100–S1500 can be omitted from the process. That is, the decompression method according to this invention is unconcerned with how and/or when the original image was converted into electronic image data, and how and/or when the electronic image data was generated, converted to compressed JPEG image data, and/or transmitted to and/or stored at the location where the compressed JPEG image data is to be decompressed. Accordingly, if the compressed JPEG image data is already available, steps S1100–S1500 can be skipped, with control continuing directly from step S1000 to step S1600.

In step S1600, the compressed image data is decompressed and rotated. Subsequently, in step S1700, the blocks are pasted into their corresponding positions. Next, in step S1800, the image data is output. Then, in step S1900 the control routine ends.

According to this invention, the method for rotating the compressed image data in the decompressor at step S1600, for example, can rotate compressed image data having an asymmetric resolution. This method can be done by receiving a group of consecutive image blocks of the compressed data file, scaling each image block in the group of blocks separately, rotating each image block separately, and pasting the consecutive image blocks in their respective positions. According to this invention, in scaling each image block, either the number of rows or the number of columns of the DCT coefficient matrix is the same for all of the blocks in the group of blocks and a sum of the other of the number of rows or the number of columns for the blocks of the group of blocks is equal to the required scaling proportion for image rotation for that group of blocks. If the number of rows for the DCT coefficient matrix of each image block is maintained, the sum of the columns of the blocks of the group of blocks must be equal to the required scaling proportion. If the number of columns for the DCT coefficient matrix of each image block is maintained, the sum of the rows of the blocks of the group of blocks must be equal to the required scaling proportion.

Figure 5:
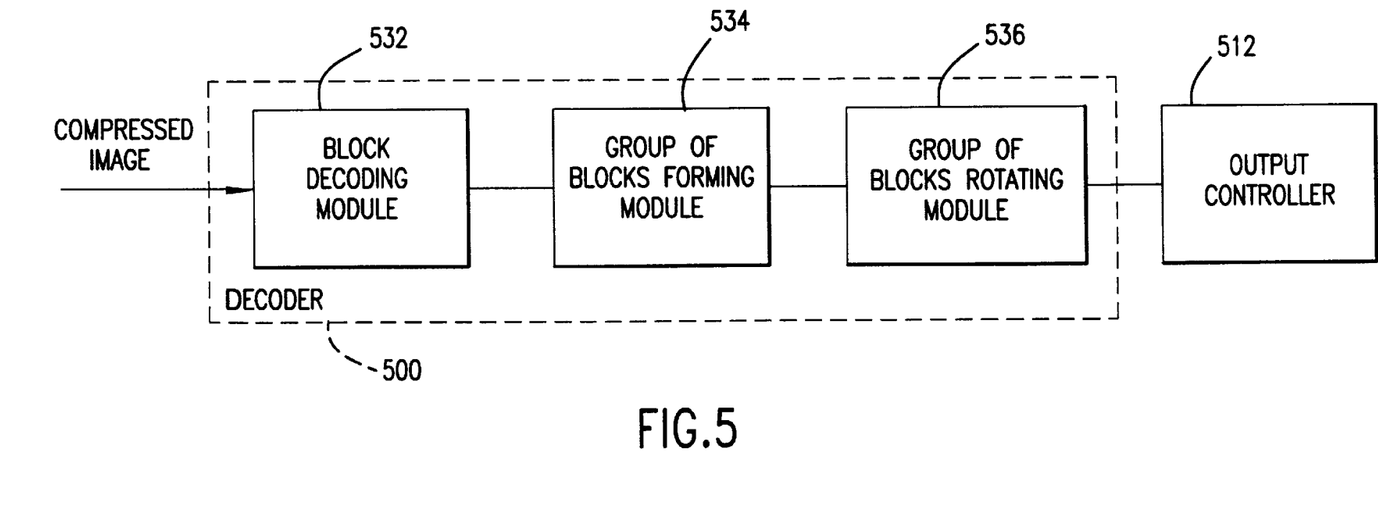
FIG. 5 shows a preferred JPEG decompressor according to this invention.

To decompress a compressed image data according to this invention, a series of functions or steps are followed to reverse the compression process. As shown in FIG. 5, the compressed data is input to the block decoding module 532 of the decompressor 500. The block decoding module 532 decodes the image data one block at a time. The decoding module 532 outputs a block of $M_1 \times M_2$ DCT coefficients. The output of the block decompression module 532 is input to a group of blocks forming module 534, which stores a plurality of blocks of DCT coefficients to form a group of blocks. A group of blocks is output from the block forming module 534 and is input to the group of blocks rotating module 536. The group of blocks rotating module 536 places the resulting blocks of pixels into their final position in a macroblock output buffer. The macroblock is understood to be formed by pixels in a rotated displacement while the group of blocks is composed by DCT coefficients.

Once all blocks are pasted into an internal macroblock buffer in the block rotating module 536, the resulting macroblock is output to the output controller module 512 which will actually paste the macroblock in its corresponding position in the resulting output image to be output to the output device 200.

In one preferred embodiment of this invention, for good image quality the final macroblock vertical block dimensions $U_i$ are selected to be as similar as possible, i.e., the blocks are selected to be as uniform as possible. The final horizontal block dimensions $V_i$ are also selected to be as uniform as possible.

In one embodiment of this invention, the compressed file is compatible with the JPEG standard, in which the blocks have 8 pixels×8 pixels and $M_1=M_2=8$.

An example is presented for illustration purposes, in which a JPEG compressed image generated for printing in a 400 ppi×600 ppi printer has to be rotated by 90° before printing. Using blocks of 8 pixels×8 pixels as practiced under JPEG, and a printer with resolution of 400 ppi×600 ppi, then $M_1=M_2=8$, $R_1=400$, and $R_2=600$. Accordingly, $R_{12}=2/3$ and $R_{21}=3/2$, and $P_1=16/3$ and $P_{12}$. Thus, $P_1$ is not an integer, but $P_2$ is. In this example, each block of 8×8 should be decompressed to 5.33 pixels×12 pixels, which is not feasible. According to this invention, the rotation is applied to a group of blocks. Also pertaining to the example, $K_1$ is selected to be 3 and $K_2$ is selected to be 1, so that $K_1 P_1=16$ and $K_2 P_2=12$. Furthermore, $V_1$ is selected to be 12, and $U_1$, $U_2$ and $U_3$ are selected to be 5, 6 and 5, respectively.

In this example, three blocks of the compressed image from the channel or storage device 300 are decoded sequentially using the block decoding module 532. For each block of the JPEG compressed data, a vector with 64 quantized DCT coefficients is decoded, following the zig-zag scan path practiced under the JPEG compression standard. The 64 element vector is mapped to an 8×8 array following the transposed zigzag arrangement, in which ordering is dictated by the following array:

$$\begin{bmatrix} 0 & 2 & 3 & 9 & 10 & 20 & 21 & 35 \\ 1 & 4 & 8 & 11 & 19 & 22 & 34 & 36 \\ 5 & 7 & 12 & 18 & 23 & 33 & 37 & 48 \\ 6 & 13 & 17 & 24 & 32 & 38 & 47 & 49 \\ 14 & 16 & 25 & 31 & 39 & 46 & 50 & 57 \\ 15 & 26 & 30 & 40 & 45 & 51 & 56 & 58 \\ 27 & 29 & 41 & 44 & 52 & 55 & 59 & 62 \\ 28 & 42 & 43 & 53 & 54 & 60 & 61 & 63 \end{bmatrix}$$

In the block decoding module 532, the DCT coefficients are inverse quantized, being multiplied by their respective quantizer step sizes. Since a rotation by 90° implies that the rows should be reversed, such operation in the DCT domain can be accomplished if all entries in the $2^{nd}$, $4^{th}$, $6^{th}$, and $8^{th}$ rows have their signs inverted.

The group of blocks forming module 534 buffers the DCT blocks necessary to construct one group of blocks. In this example, a group of 3 consecutive blocks is buffered and subsequently output by the group of blocks forming module 534.

Figure 6:
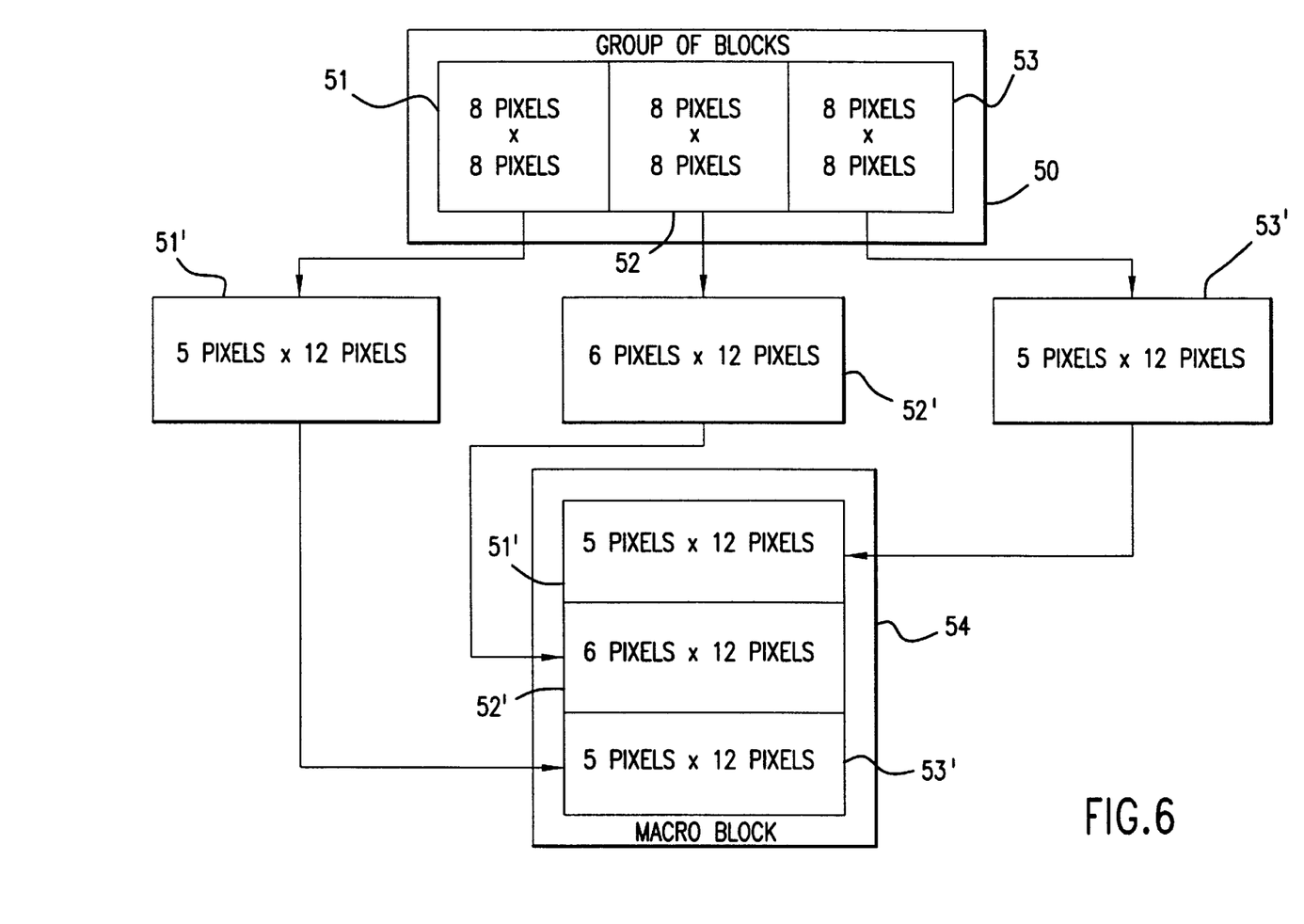
FIG. 6 is a flowchart outlining a macroblock reconstruction process according to this invention.

The group of blocks rotating module 536 is responsible for reconstructing a rotated macroblock from the input group, wherein pixels in a macroblock are in their final position. Referring to FIG. 6, in a first embodiment of this invention, each of the three blocks 51, 52 and 53 of 8 pixels×8 pixels, forming a group of blocks 50 undergoes a scaled inverse transform. The block 51 is inverse transformed to yield a rotated block 51' that has 5 pixels×12 pixels. The block 52 is inverse transformed to yield a rotated block 52' that has 6 pixels×12 pixels. The block 53 is inverse transformed to yield a rotated block 53' that has 5 pixels×12 pixels.

The rotated blocks 51', 52' and 53' are placed into a final macroblock 54. The final macroblock 54 is input to the output controller module 512, which sends the resulting image data to the output device 200.

In the first embodiment of the decompressing rotating process of step S1600, the 8×8 DCT coefficients in a block output from the block decoding module 532 is:

$$\begin{bmatrix} y_{11} & y_{12} & \cdots & y_{18} \\ y_{21} & y_{22} & \cdots & y_{28} \\ \vdots & \vdots & \ddots & \vdots \\ y_{81} & y_{82} & \cdots & y_{88} \end{bmatrix}.$$

As set forth above, to reconstruct a block with 5 pixels×12 pixels, an intermediary matrix $Y_1$ is constructed by removing the last 3 rows of the DCT coefficients and by appending 4 columns of zeros to the right of the original matrix:

$$Y_1 = \begin{bmatrix} y_{11} & y_{12} & \cdots & y_{18} & 0 & 0 & 0 & 0 \\ y_{21} & y_{22} & \cdots & y_{28} & 0 & 0 & 0 & 0 \\ \vdots & \vdots & \ddots & \vdots & \vdots & \vdots & \vdots & \vdots \\ y_{51} & y_{52} & \cdots & y_{58} & 0 & 0 & 0 & 0 \end{bmatrix}.$$

The rotated block of pixels 51' or 53' is the result of the following calculation:

$$\frac{\sqrt{60}}{8} D_5^T Y_1 D_{12},$$

where:

$D_5$ is a 5×5 transposed forward DCT matrix;
$D_{12}$ is a 12×12 forward DCT matrix; and
T means the transposition operation.

The rotated block of pixels 52' is the result of similar calculation, where the matrix $Y_2$ is obtained by removing the bottom two rows and adding 4 columns of zeros to the right of the original matrix:

$$Y_2 = \begin{bmatrix} y_{11} & y_{12} & \cdots & y_{18} & 0 & 0 & 0 & 0 \\ y_{21} & y_{22} & \cdots & y_{28} & 0 & 0 & 0 & 0 \\ \vdots & \vdots & \ddots & \vdots & \vdots & \vdots & \vdots & \vdots \\ y_{61} & y_{62} & \cdots & y_{68} & 0 & 0 & 0 & 0 \end{bmatrix},$$

while the rotated block of pixel 52' is the resulting matrix from the following calculation:

$$\frac{\sqrt{72}}{8} D_6^T Y_2 D_{12},$$

where:

$D_6$ is a 6×6 forward DCT matrix; and
$D_{12}$ is a 12×12 forward DCT matrix.

Figure 7:
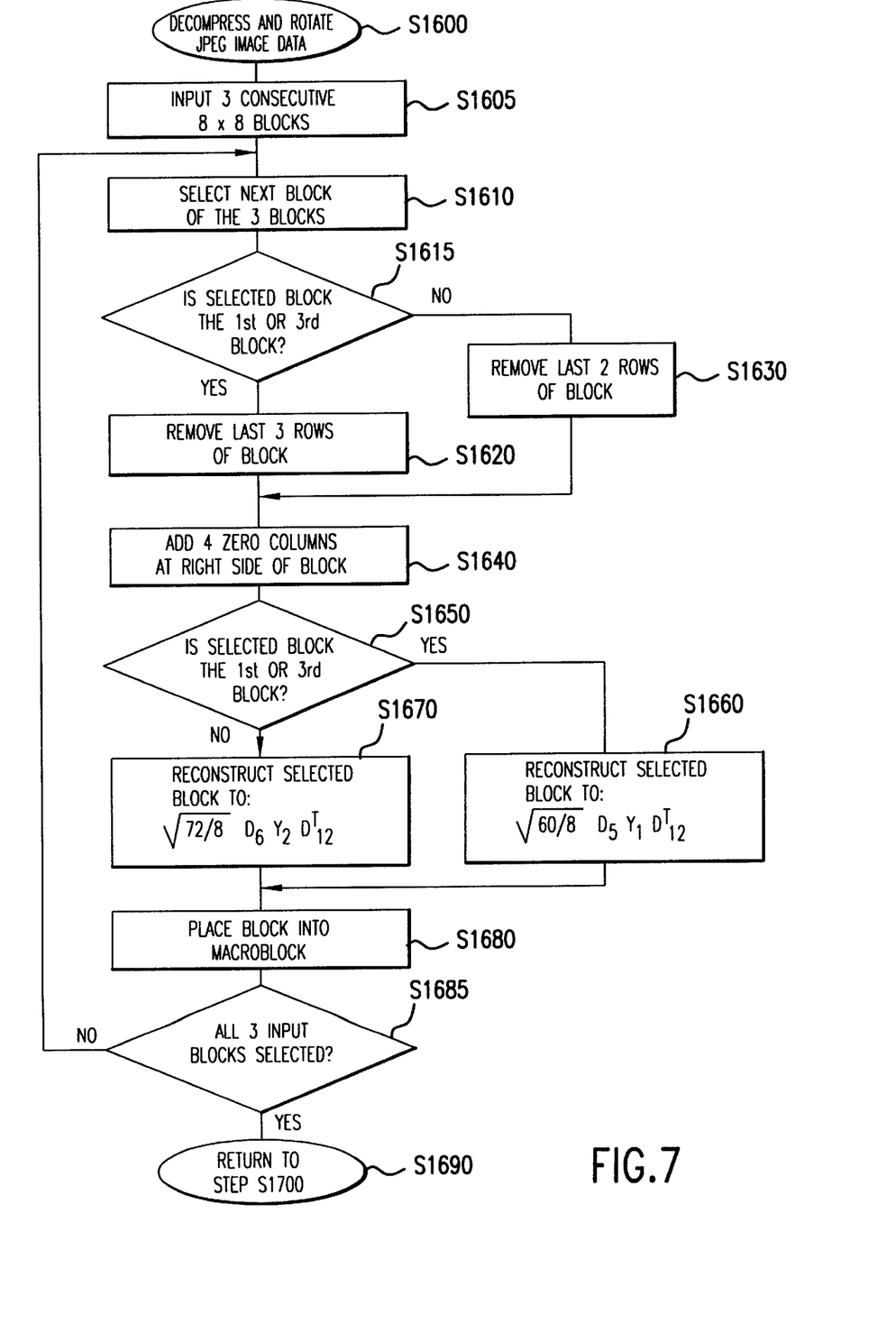
FIG. 7 is a flowchart outlining a compressed image data rotation process according to this invention.

FIG. 7 outlines in greater detail the first embodiment of the decompressing and rotating process of step S1600. In the embodiment shown in FIG. 7, the number of columns is maintained for all of the blocks of the group. As shown in FIG. 7, the control routine begins at step S1600 and continues to step S1605. In step S1605, three consecutive blocks of 8×8 are input. Then, in step S1610, the next block of the three blocks is selected. Next, in step S1615, the control routine determines if the selected block is the first or third block. If so, control continues to step S1620. Otherwise, if the selected block is the second block, control jumps to step S1630.

In step S1620, the last three rows of the DCT coefficients in the selected block are removed. Control thenjurnps to step S1640. In step S1630, the last two rows of the DCT coefficients in the selected block are removed. Control then continues to step 1640.

In step S1640, four zero columns are added to the right side of the DCT coefficients in the selected block. Next, in step S1650, the control routine determines if the selected block is the first or third block. If the block is the first or third, control proceeds to step S1660. Otherwise, if the selected block is the second block, control jumps to step S1670.

In step S1660, the selected block is reconstructed using the transform $$\frac{\sqrt{60}}{8} D_5 Y_1 D_{12}^T,$$

Control then jumps to step S1680.

In step S1670, the selected block is reconstructed using the transform $$\frac{\sqrt{72}}{8} D_6 Y_2 D_{12}{}^T,$$

Control then continues to step S1680.

In step S1680, the current block is placed into a macroblock. Then, in step S1685, the control routine determines if all three input blocks have been selected. If so, control continues to step S1690. Otherwise, if there is one or more unselected locks remaining in the current group, control returns to step S1610.

In step S1690, control returns to step S1700.

In the embodiment outlined above with respect to FIGS. 6 and 7, a 600 ppi×400 ppi image was compressed using JPEG compression and was simultaneously decompressed and rotated for printing on a 400 ppi×600 ppi printer using the matrix $F_1$. In contrast, if a 400 ppi×600 ppi image was compressed using JPEG compression and is to be simultaneously decompressed and rotated for printing on a 600 ppi×400 ppi printer, that image would be decompressed and rotated using the matrix $F_2$ discussed above, where the matrix $F_2$ is reduced in the horizontal direction and extended with null rows in the vertical direction.

It should be appreciated that these calculations are one of the possible methods to reconstruct the pixel block and other more efficient techniques employing fast DCT algorithms can be applied as well.

In the example outlined above with respect to FIGS. 6 and 7, the blocks corresponding to each group of blocks, if simply decompressed, would generate a macroblock of 8 pixels×24 pixels and occupy a printed area of 0.02 in.×0.04 in at a resolution of 400 ppi×600 ppi. If this simplistic macroblock was purely rotated into a new macroblock of 24 pixels×8 pixels, the printed area would be 0.06 in.×0.0133 in. According to this invention, the resulting macroblock has 16 pixels×12 pixels for which the printed area is 0.04 in.×0.02 in. maintaining the aspect ratio of the corresponding image.

As shown in FIG. 1, the decoder 500 is preferably implemented on a programmed general purpose computer. However, the decoder 500 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing steps S1600–S1700 of FIG. 4 and the flowcharts shown in FIGS. 6 and 7 can be used to implement the decoder 500.

This invention has been described in connection with the preferred embodiments. However it should be understood that there is no intent to limit the invention to the embodiments described above. On the contrary, the intent to cover all alternatives, modification, and equivalents as may be included within the spirit and scope of the invention.

What is claimed is:

1. A method for rotating and decompressing a compressed image for devices having an asymmetric resolution, comprising:

inputting a compressed image data file having asymmetric resolution;

receiving a group of consecutive image blocks of the compressed data file;

partially decompressing each image block in the group;

manipulating the data in a transform domain of each block so as to perform spatial rotation and scaling;

inverse transforming each image block, completing the decompression and placing the result into a macroblock buffer; and placing the macroblock buffer contents into an output image buffer.

2. The method of claim 1, wherein each scaled-inverse-transformed image block in the group comprises a same number of rows.

3. The method of claim 2, wherein a sum of columns of the group of consecutive image blocks equals a required scaling proportion for image rotation.

4. The method of claim 1, wherein each scaled-inverse-transformed image block in the group comprises a same number of columns.

5. The method of claim 4, wherein a sum of rows of the group of consecutive image blocks equals a required scaling proportion for image rotation.

6. An apparatus including a decompressor that rotates and decompresses compressed image data contained in a compressed data file for devices having an asymmetric resolution, the decompressor comprising:

an image source for providing a compressed image data file having asymmetric resolution;

a block decoding module which decodes the compressed image data file one block at a time;

a group of blocks forming module which receives a plurality of blocks from the block decoding module and stores the plurality of blocks of DCT coefficients to form a group of blocks; and a group of blocks rotating module which receives the group of blocks, completes the decompression and places the group of blocks in a macroblock buffer.

7. The apparatus of claim 6, wherein the decompressor is a JPEG decompressor.

8. The apparatus of claim 6, wherein each block in the group of blocks comprises a same number of rows.

9. The apparatus of claim 8, wherein a sum of columns of the group of blocks equals a required scaling proportion.

10. The apparatus of claim 6, wherein each block in the group of blocks comprises a same number of columns.

11. The apparatus of claim 10, wherein a sum of rows of the group of blocks equals a required scaling proportion.

12. An apparatus including a decompressor that rotates and decompresses compressed image data contained in a compressed data file for devices having an asymmetric resolution, the decompressor comprising:

means for providing a compressed image data file having asymmetric resolution;

means for receiving a group of consecutive image blocks of the compressed data file;

means for partially decompressing each image block in the group;

means for manipulating the data in a transform domain of each block so as to perform spatial rotation and scaling;

means for inverse transforming each image block, completing the decompression and placing the result into a macroblock buffer; and means for placing the macroblock buffer contents into an output image buffer.

13. The apparatus of claim 12, wherein the decompressor is a JPEG decompressor.

14. The apparatus of claim 12, wherein each scaled-inverse-transformed image block comprises a same number of rows.

15. The apparatus of claim 14, wherein a sum of columns of the group of consecutive image blocks equals a required scaling proportion.

16. The apparatus of claim 12, wherein each scaled-inverse-transformed image block comprises a same number of columns.

17. The apparatus of claim 16, wherein a sum of rows of the group of consecutive image blocks equals a required scaling proportion.

18. The apparatus of claim 12, further comprising means for inputting the compressed data file to the decompressor.

* * * * *